United States Patent [19]

Hohman

[11] 3,877,917

[45] Apr. 15, 1975

[54] BATCH FEEDER FOR GLASS FURNACES AND METHOD OF USING SAME

[75] Inventor: Charles M. Hohman, Newark, Ohio

[73] Assignee: Owens-Corning Fiberglas Corporation, Toledo, Ohio

[22] Filed: Oct. 24, 1973

[21] Appl. No.: 409,196

[52] U.S. Cl.................................. 65/135; 65/335
[51] Int. Cl.............................................. C03b 3/00
[58] Field of Search............................ 65/134–136, 65/335, 345; 13/6

[56] References Cited
UNITED STATES PATENTS

| | | | |
|---|---|---|---|
| 1,992,994 | 3/1935 | Delpech | 13/6 X |
| 2,863,932 | 12/1958 | Gell et al. | 65/335 X |
| 3,486,874 | 12/1969 | Rough | 65/335 X |
| 3,748,112 | 7/1973 | Phillips | 65/335 |

Primary Examiner—Robert L. Lindsay, Jr.
Attorney, Agent, or Firm—Carl G. Staelin; John W. Overman; Allen D. Gutchess, Jr.

[57] ABSTRACT

Glass melting apparatus and a method of operating same are provided. The apparatus includes a glass melting tank, an enclosure thereabove, heating means, and apparatus for supplying batch to the tank. The heating means include gas-fired burners mounted in upright walls of the enclosure, which walls can be raised when the furnace is placed in operation. The heating means further include a plurality of electrodes extendible through the tank bottom and raised to project farther into a layer of molten glass in the tank as the depth thereof increases. The batch supply apparatus includes a carriage extending across the tank and movable back and forth above the tank from one end to the other. The carriage has several individual batch-feeding units which selectively deposit batch at predetermined rates to predetermined areas of the tank. The batch is deposited gently on the top of the layer in the tank and exhaust means are provided adjacent the area of deposition to provide a substantially dust-free operation. The batch is supplied to the feeding units of the carriage beyond one end of the tank with dust-retaining bellows located between supply chutes and the batch-feeding units to further minimize dust.

20 Claims, 7 Drawing Figures

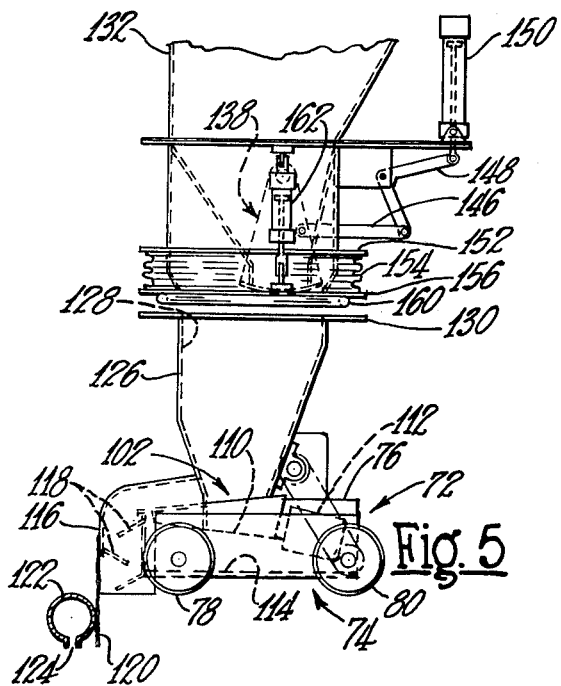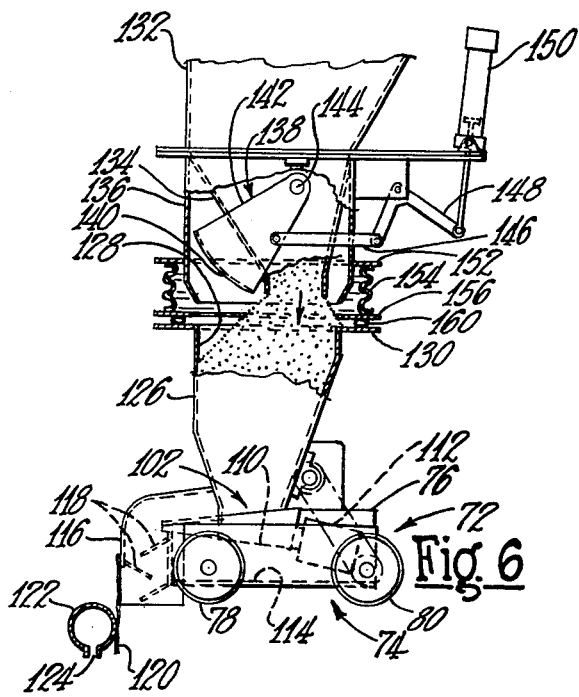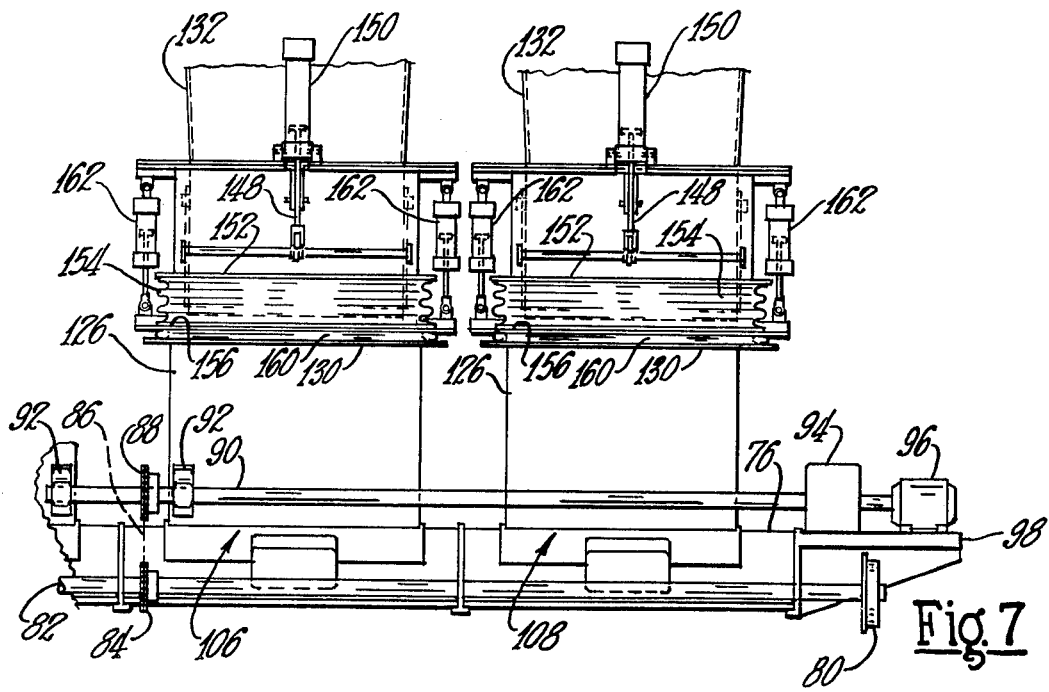

BATCH FEEDER FOR GLASS FURNACES AND METHOD OF USING SAME

This invention relates to apparatus for changing batch material from a solid to a heat-softened state and to a method of operating same.

The present invention is primarily concerned with a glass melting furnace utilizing electrical means as the main source of heat. Electrically-operated melting tanks of the type having electrodes immersed in the molten or heat-softened material therein require that such material be capable of conducting electricity. However, glass batch in a solid state, e.g., in the form of powder or cullet, is not conducting, although as it changes to a heat-softened or molten state it becomes conducting with the conductivity increasing or the resistance decreasing as the temperature increases. Consequently, other means are required to initiate the melting of the glass batch until a heat-softened, conducting stage is attained.

The present method and apparatus are directed to initiating operation of a glass melting furnace or the like by utilizing gas-fired burners above a melting tank to initially convert a solid batch material to a heat-softened, conducting state. The gas-fired burners are located in side walls of an enclosure above the melting tank with the burners initially fired before any batch is placed in the tank to provide initial heating of same. Glass batch is then supplied substantially uniformly over the bottom of the glass melting tank with the gas-fired burners operating to convert the batch to a heat-softened or molten state, batch being continually supplied during this conversion to provide an ever-increasing thickness in the layer of molten glass in the tank.

As the layer increases, electrodes located in the bottom of the tank are raised to project into the tank, with the extent of projection being increased as the thickness of the molten layer increases. The electrodes are always retained immersed within the layer, however, never projecting thereabove. The operation is continued in this manner until the depth of the layer reaches a predetermined level. As the depth increases, the current flowing between the electrodes as they extend further into the tank is increased while the firing rate of the gas-fired burners is decreased. After the predetermined depth is reached, the gas-fired burners are shut off entirely and the side walls of the furnace, in which the burners preferably are mounted, are then raised to expose the surface of the layer in the tank to ambient conditions. The surface of the layer is thus cooled while additional batch is supplied thereover, thereby forming a crust on the layer which also serves as an insulating blanket.

Subsequently, additional batch is supplied over the layer by a unique batch supply carriage to maintain the crust thereon during continued operation of the furnace. This carriage is movably supported on rails located at opposite sides of the tank with the carriage extending completely across the layer in the tank, the carriage being moved back and forth between the ends of the tank, thereby traversing the entire layer therein. The carriage has several independent batch-feedng units which can supply batch to selected areas of the layer at independently-controllable rates. This enables additional batch to be supplied in areas of the layer where the crust is thinner, by way of example, and to reduce the supply of batch to those areas where the crust is thicker. This assures that a minimum crust will be maintained over all of the tank to reduce heat loss and to protect the carriage against excessive heat.

The batch from the carriage is supplied gently on the crust to minimize the creation of dust with exhaust provisions also mounted on the carriage to further reduce any dust. Supply chutes are located beyond one end of the tank so that individual hoppers of the batch-feeding units can be filled as needed beyond the tank. Dust bellows are also provided between the supply chutes and the hoppers to further reduce the dust problem. The carriage also has additional features which will be discussed in the subsequent detailed description.

It is, therefore, a principal object of the invention to provide an electrically-operated furnace for melting glass batch and a method of operating same.

Another object of the invention is to provide improved apparatus for supplying batch over an existing layer of material in a container.

A further object of the invention is to provide a glass melting furnace having side walls which can be raised.

Yet another object of the invention is to provide a glass melting furnace utilizing electrodes within a layer of glass in the furnace and fuel-fired burners thereabove.

Many other objects and advantages of the invention will be apparent from the following detailed description of a preferred embodiment thereof, reference being made to the accompanying drawings, in which:

FIG. 5 is a somewhat schematic side view in elevation of the carriage of FIG. 4 located at one end of the furnace below a supply chute;

FIG. 6 is a view similar to FIG. 5 but with a hopper of the carriage being loaded, and with parts broken away and with parts in cross section; and FIG. 7 is a fragmentary front view in elevation of the carriage and supply chute of FIGS. 5 and 6.

Figure 1:
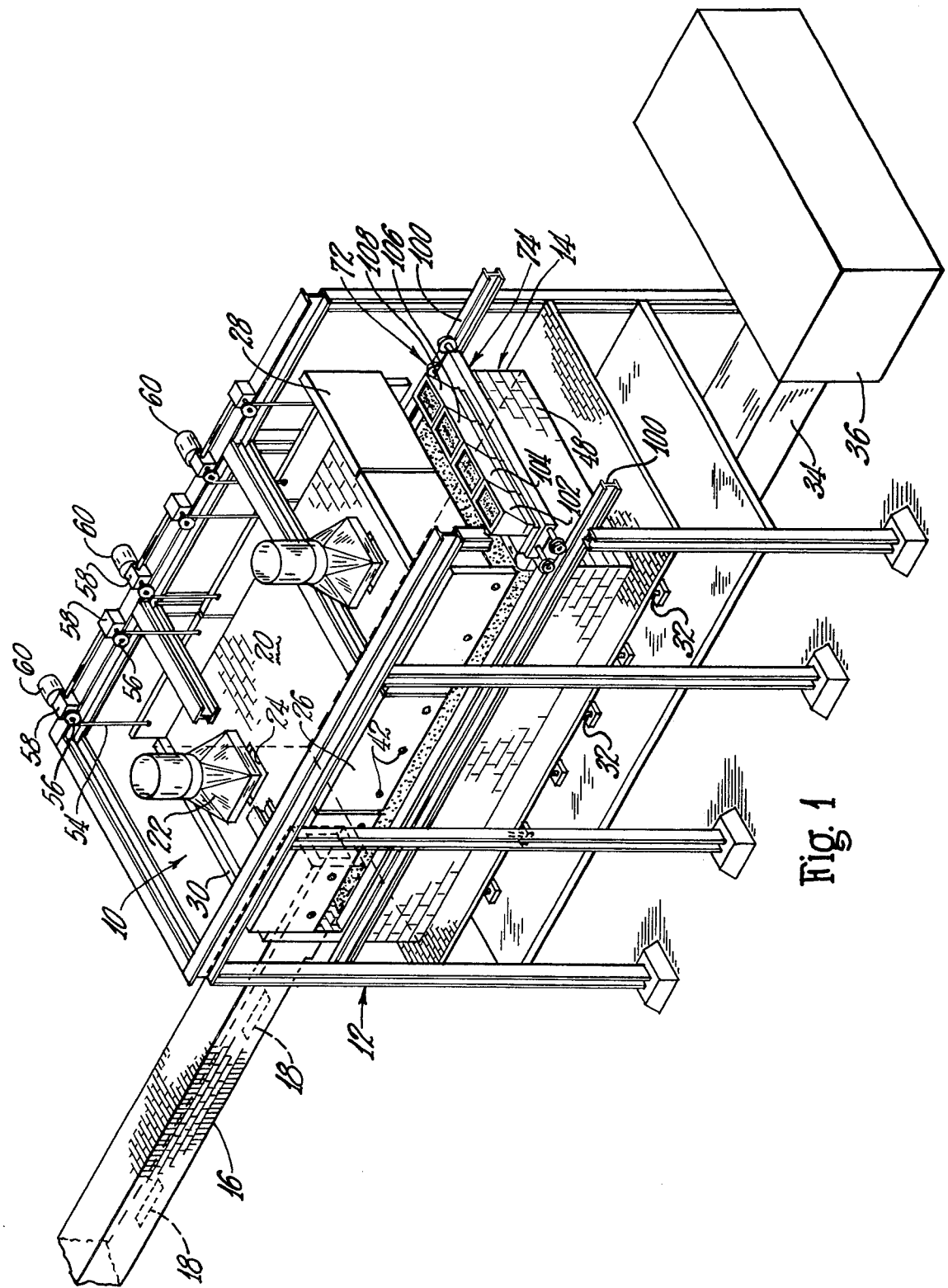
FIG. 1 is a somewhat schematic view in perspective, with parts broken way, of a glass melting furnace according to the invention.

Referring to the drawings, and particularly to FIG. 1, an overall glass melting furnace is indicated at 10 and is shown in a typical environment, being supported by a framework 12 in a multi-story building (not shown). The furnace includes a melting tank or container 14 which, in this instance, supplies molten glass to a forehearth 16 from which the glass is supplied through openings 18 to bushings (not shown) located therebelow and from which textile filaments are attenuated. A dome or roof 20 is supported above the tank 14 with exhaust ducts 22 communicating with openings 24 in the roof. Movable upright side and end walls 26 and 28 extend between the tank 14 and the roof 20 to form an enclosure for the tank along with an end wall 30 at the discharge end which may or may not be movable.

Figure 2:
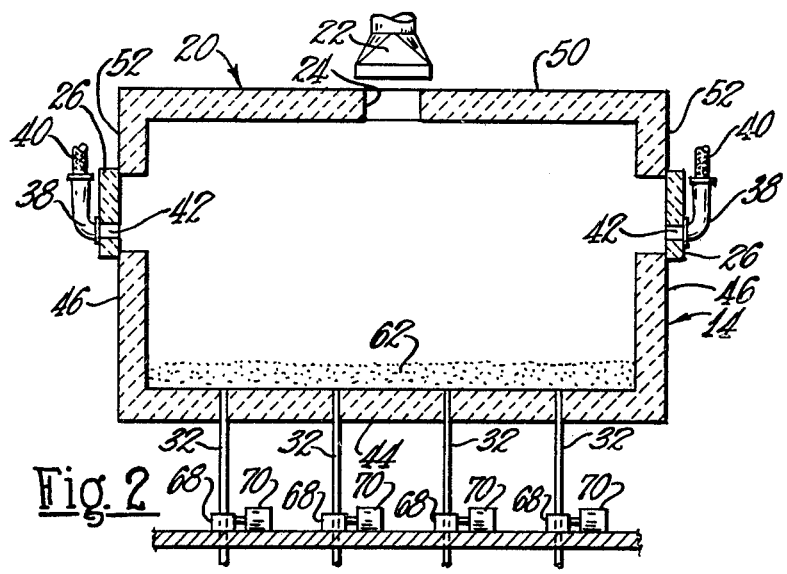
FIG. 2 is a schematic view in transverse cross section of the furnace of FIG. 1, shortly after being initially placed in operation.

For heating the furnace 10, the heating means include a plurality of electrodes 32 extending upwardly into the tank 14 from a lower level as shown in FIG. 1. The electrodes 32 are suitably positioned throughout the tank in a desired pattern and location according to the needs of the particular tank, as is well known in the electrical furnace art. The portion of the electrodes 32 exposed below the tank 14 can be protected by suitable sleeves therearound containing inert gas, and the electrodes can also be water cooled, if desired, as is well known in the art. Power is supplied to the electrodes 32 through leads located in a duct or channel 34 connected with power source in a housing 36. The heating means also include fuel, preferably gas, burners 38 (FIGS. 2–4) having flexible supply lines 40 connected with suitable control valves (not shown). The burners 38 fire through ports 42 located in the upright walls 26 with the flexible lines 40 enabling the burners to move with the upright walls. The burners fire into the space defined by the roof and walls above the tank 14, with the products of combustion exhausted through the ducts 22.

Referring in more detail to certain parts of the furnace 10, the melting tank 14 is made of suitable refractory blocks as is known in the art and includes a bottom 44, side walls 46, and end walls 48. The roof 20 includes a generally horizontally-extending portion 50 and depending sides 52, the roof being suspended in a stationary position above the tank 14 by the framework 12. In this instance, three of the upright side walls 26 extend the length of the melting tank 14, while two of the upright end walls 28 extend across the width of the tank, the upright walls being raised and lowered by suitable means. As shown in FIG. 1, the walls are suspended by two cables 54 which are wound on drums 56 connected to right-angle drives 58, one of which is driven by a motor 60. The motors can thus be individually operated to raise the upright walls 26 and 28 as desired. Numerous other means, including manual means, can be provided to raise and lower the upright walls. It is also possible to lower the upright walls below the level of the tank 14, if desired, rather than to raise them above the depending sides 52. In either case, the purpose is to open the tank to ambient conditions through the space exposed between the upper edges of the tank 14 and the roof 20.

Figure 3:
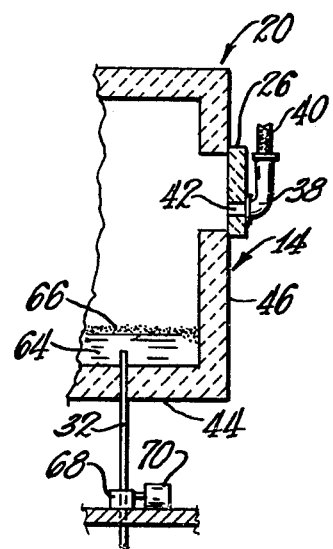
FIG. 3 is a fragmentary view of a portion of the furnace of FIG. 2, after a period of operation.
Figure 4:
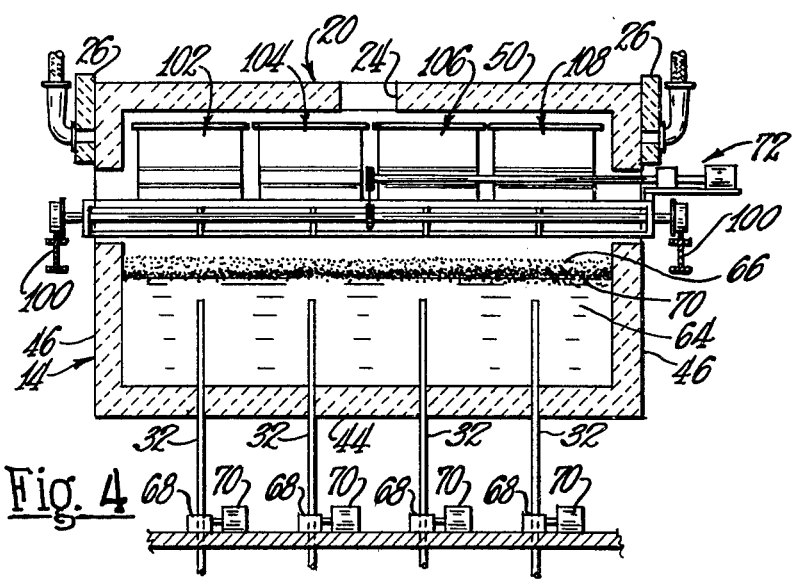
FIG. 4 is a view similar to FIG. 2 after the furnace has reached its normal operation, and with a batch supply carriage in place.

The operation, and particularly the initial operation, of the furnace 10 will now be described. When the furnace is new or the refractory has been rebuilt, the tank 14 is maintained in an empty condition while it is heated by the burners 38 firing therabove. As the temperature of the tank increases, the heat-up rate of the burners 38 is preferably increased. When the temperature of the tank 14 reaches a predetermined value, e.g. 2,400°F., glass batch in the form of powder or cullet, preferably at this time in the form of cullet, is applied uniformly over the bottom 44 of the tank. This batch can be supplied by suitable means, such as flexible line through which the batch is blown, the line being controlled by an operator at an opening at the side or end of the tank to direct the batch uniformly over the tank bottom. Temperatures of the forehearth, throat, etc. of the furnace are also suitably controlled at this time, depending upon the specific design of the heating means and the tank. The burners 38 are then fired at a given rate to produce a substantially constant temperature in the tank 14, e.g., 2,500°F., while the bath is continued to be supplied thereto. The bath initially forms a layer 62 (FIG. 2) which gradually melts to form a molten layer 64 of glass, with a thin layer 66 of newly-deposited batch thereon (FIG. 3).

When the molten layer 64 reaches a predetermined thickness or level, e.g., 12 inches, the electrodes 32 are begun to be raised upwardly through the tank bottom 44. Initially, the upper ends of the electrodes 32 can be about level with the inner surface of the tank bottom 44 and preferably are recessed slightly therebelow with temporary refractory patches above the ends of the electrodes for protection. To raise them, each of the electrodes 32 has a gear drive 68 and a motor 70, and are raised at a rate such that the upper ends of the electrodes 32 always are maintained below the surface of the molten layer 64. When the layer is about twelve inches deep, the electrodes will project six inches into the tank above the bottom 44, by way of illustration. At this time, power is supplied to the electrodes 32 to initiate electric heating of the glass layer 64 in addition to the overhead heating by the burners 38.

The burners 38 continue to be fired while the batch continues to be supplied to the layer 66 on the molten layer 64. As the thickness of the layer 64 continues to increase or the level rises, the electrodes 32 continue to be moved upwardly into the tank 14, always remaining below the surface of the molten layer 64. As the electrodes are raised, the current passing between the associated connected electrodes is increased so that the amount of heating achieved electrically continues to increase, with the firing rate of the burners 38 being decreased as necessary to maintain the desired temperature in the tank 14. The operation is continued in this manner until the glass level of the layer 64 reaches a desired value, e.g., 50 inches, at which time the electrode are raised to a maximum amount, e.g., 38 inches above the tank bottom 44. At this time, all heat is supplied electrically and the firing rate of the burners 38 is reduced to zero. As more heat is supplied from within the molten layer 64 and less thereabove, an intermediate crust 70 forms between the molten layer 64 and the thin batch layer 66 thereabove.

With the burners 38 off, and the molten layer 64 at the desired level, the upright walls 26 are begun to be raised to expose the surface of the glass to ambient conditions and to cause cooling thereof. Additional batch can be supplied on the crust 70 during this operation so that the crust and batch form an insulating layer on the molten layer 64 of glass. At this time, a permanent charger indicated at 72 in FIGS. 1 and 4 can be placed in operation to supply glass batch, preferably now in the form of a powder, to the tank 14, the charger 72 moving back and forth over the entire tank to supply the batch uniformly thereto. Continued operation of the furnace 10 is then substantially conventional, with the batch added equaling the molten glass removed through the forehearth 16 and with the electrodes 32 supplied with the proper power to maintain the desired temperature in the furnace.

The batch charger 72 includes a carriage 74 comprising an elongate, rectangular frame 76 supported by idler wheels 78 and driven wheels 80. Referring particularly to FIG. 7, the driven wheels 80 are affixed to ends of a driven axle 82 which extends the entire length of the carriage 74 and has a driven sprocket 84 centrally thereof. The sprocket 84 is driven through a chain 86 and a drive sprocket 88 mounted on a drive shaft 90 rotatably supported by bearing blocks 92 and 94. A drive motor 96 is connected to the outer end of the shaft 90, being located on a supporting platform 98 constituting part of the frame 76. With the central drive for both of the wheels 80, the same degree of twist or torque is placed on the axle 82 to assure that the wheels 80 are driven equally to maintain the carriage 74 truly perpendicular to the longitudinal extent of the tank 14. As shown in FIG. 1, the wheels 78 and 80 ride on beams or tracks 100 which are supported by the framework 12 beyond the sides of the tank 14. The tracks 100 extend the full length of the tank 14 and beyond the forward or upstream end, to a loading station outside of the end walls 28.

Four individual batch feeding units 102, 104, 106, and 108 are mounted on the carriage 74 to supply batch over the surface of the crust 70 on the molten glass layer 64. The rate of feed of the batch from each of the feeders 102 – 108 can be individually controlled to provide selective control of the thickness of the crust 70 and the batch layer 66 over the width of the tank 14. This is important to assure that the crust 70 will be sufficiently thick to prevent excessive heat radiation from the molten layer 64 to the charger 72 as it moves back and forth over the tank. Where a thin area occurs in the crust 70, the rate of feed of the appropriate feeder thereabove can simply be increased to increase the batch layer 66 and build the thickness of the crust 70 once again. This not only protects the charger but also reduces heat loss from the molten layer 64. The individual feeders 102 – 108 can also be controlled during their travel over the length of the tank to provide different rates of feed over various portions of the length. Where the feeders are controlled automatically, the length of the tank can be divided into four parts, by way of illustration, with the rate of feed individually controlled for each of the four parts. This provides a total of 16 zones or areas over the tank for which rates of batch feed can be selectively and individually controlled.

In the specific form shown, the feeders 102 – 108 can be of a commercially-available, vibratory type, each including a feed trough 110 and a vibratory drive unit 112 (FIGS. 5 and 6). The amplitude of vibration caused by the drive units 112 can be varied to vary the rate of feed through the troughs 110 accordingly. The units 112 are protected by a horizontally-extending, refractory panel or board 114 located therebelow which is carried by the frame 76 and protects the components and particularly the drive units 112 from the heat therebelow. Means can be provided to establish a flow of cooling air past the feeders 102 – 108 particularly to prevent over heating of the drive units 112, if desired.

At the discharge end of each of the troughs 110 is a discharge chute 116 containing baffles 118 which retard the fall of the batch from the trough and reduce the amount of dust created thereby. A flexible refractory cloth or curtain 120 further contains the dust from the powdered batch and an exhaust duct 122 having an entrance nozzle 124 adjacent the curtain 120 collects substantially any air-borne batch dust. The arrangement of the discharge chute 116 with the baffles 118, along with the curtain 120 and the exhaust duct 122, thereby substantially eliminates any dust problems otherwise caused by the deposit of the powdered batch on the layer 66 in the tank.

The batch is supplied to the troughs 110 from individual hoppers 126 located thereabove. The upper ends of the hoppers 126 terminate in charge openings 128 having outwardly-extending flanges 130.

After several passes over the tank 14, the hoppers 126 must be refilled. Accordingly, the carriage 74 is moved to the loading station beyond the forward or upstream end of the tank 14 to the position of FIGS. 1, 5, and 6. At this location, each of the hoppers 126 is directly below a loading chute 132 and specifically beneath an extension 134. A shroud 136 is positioned around each of the chute extensions 134, totally enclosing the extension which has a small discharge opening within the shroud. Each extension has a control gate indicated at 138 including an arcuate closure 140 and side ears 142 pivotally supported by pins 144 connected to the chute extension 134. The gate 138 has a closed position as shown in FIG. 5 covering the discharge opening of the extension 134 and an open position as shown in FIG. 6 in which it is located entirely to the side of the discharge opening of the extension 134. The gate 138 is moved between the two positions by a connecting link 146, an L-shaped link 148, and a fluid-operated cylinder 150.

An upper flange 152 is affixed to the periphery of the shroud 136 and has a bellows 154 extending downwardly therefrom, terminating at its lower end in a lower flange 156, to the lower surface of which is affixed a tubular seal 160. The lower flange 156 and the bellows 154 are moved up and down by side cylinders 162 suitably connected therewith. The cylinders 162 move the lower flange 156 from an upper position near the lower end of the shroud 136 to a lower position in which the seal 160 engages the flange 130 of the hopper 126. The cylinders 162 are operated when the charger 72 is in position below the chutes 132 to provide a dust seal between the chute extension 134 and the hopper 126, thereby containing dust during loading. The cylinder 150 is then operated to open the gate 134 into the hopper 126. The gate 138 can then be closed by a level control or by a timer which maintains the gate open for a period sufficient to assure filling of the hopper 126. After the hopper is filled and the gate 138 is closed, the bellows 154 and the lower flange 156 are raised to space the loading apparatus above the hopper 126 to enable the carriage 74 to again move into position above the tank 14.

Various modifications of the above-described embodiment of the invention will be apparent to those skilled in the art, and it is to be understood that such modifications can be made without departing from the scope of the invention if they are within the spirit and the tenor of the accompanying claims.

I claim:

1. Apparatus for depositing batch of particulate glass-forming material substantially uniformly over a pool of molten glass, said apparatus comprising track means located on opposite sides of the pool, an elongate frame, wheel means carried by said frame and engageable with said track means to rotatably support said frame above the pool and to enable the frame to move back and forth over the pool, and a plurality of separate batch feed means supported along said frame between opposite ends thereof, said batch feed means being individually controllable to control the rate of feed deposited on the pool therefrom.

2. Apparatus according to claim 1 characterized by a downwardly-extending discharge chute for each of said batch feed means with said chutes having means therein to retard the downward rate of movement of the material.

3. Apparatus according to claim 2 characterized by a fire resistant curtain associated with said chutes to contain air-borne particles from the material.

4. Apparatus according to claim 2 characterized by an exhaust duct located near a lower discharge opening of said downwardly-extending chute.

5. Apparatus for depositing particulate glass-forming material substantially uniformly over a pool of molten glass, said apparatus comprising track means located on opposite sides of the pool and extending beyond an edge thereof, an elongate frame, wheel means carried by said frame and engageable with said track means to rotatably support said frame above the pool and to enable the frame to move back and forth over the pool, a plurality of individually controlled batch feed means supported by said frame, a hopper extending upwardly from each of said batch feed means, and a supply chute positioned outside said pool beyond said edge thereof and between said track means, whereby said hoppers can be aligned with said supply chute when said frame is located outside said pool.

6. Apparatus according to claim 5 characterized by seal means adapted to be connected between said supply chute and said hoppers when said supply chute and said hoppers are in alignment.

7. Apparatus according to claim 6 characterized by said seal means comprises a bellows, and means for moving a lower portion of said bellows from a position spaced above said hoppers to a position in contact with an upper portion of said hoppers.

8. Apparatus according to claim 7 characterized by said bellows having a lower flange, and sealing means carried below said flange for providing a seal between said flange and said hoppers.

9. Apparatus according to claim 6 characterized by a gate located at a lower end of said supply chute, and means for remotely controlling said gate between open and closed positions.

10. Apparatus for depositing particulate glass-forming material substantially uniformly over a pool of molten glass, said apparatus comprising track means located on opposite sides of the pool, an elongate frame, a wheel rotatably carried by said frame near each end thereof and engageable with said track means to rotatably support said frame above the pool a plurality of separate glass supply means carried by said frame and extending across the pool, and to enable the frame to move back and forth over the pool, an axle extending the length of said elongate frame and connected to both of said wheels, and means carried by said frame for engaging and driving a central portion of said axle for driving both of said wheels.

11. Apparatus according to claim 10 characterized by said engaging and driving means includes a driven member affixed to a central portion of said axle, a motor located at one end of said frame, and means connecting said motor and said driven means.

12. A method of feeding particulate glass batch to the surface of a layer of batch on a pool of molten glass in a glass melting tank which comprises positioning a plurality of individual glass batch supply means above the layer across the pool, moving said supply means back and forth over the layer in the tank, and individually depositing batch from each of said supply means onto areas of the layer as the supply means move back and forth thereover.

13. The method according to claim 12 characterized by moving said supply means to a position outside the space above said layer from time-to-time, and replenishing the supply means at said position.

14. The method according to claim 12 characterized byy establishing a negative pressure adjacent the areas of deposition of the batch on the layer to remove airborne particles caused by the deposition.

15. A method of depositing particulate glass-forming material substantially uniformly over a pool of molten glass, said method comprising establishing a plurality of individual supply means of the particulate material above and across the pool, establishing a stream of downwardly moving particulate material from each of said supply means toward the pool therebelow, and moving said supply means and streams back and forth over the pool.

16. The method according to claim 15 characterized further by stopping said streams, moving said supply means to a position beyond the pool, and replenishing the supply means at said position.

17. The method according to claim 15 characterized by moving said streams from the supply means in generally horizontal directions by means of vibratory motions, and subsequently enabling the streams to move downwardly toward the pool under the influence of gravity.

18. Apparatus for deposition particulate batch over a pool of molten glass, said apparatus comprising a frame, means for moving the frame back and forth over the pool, a plurality of separate vibratory batch feeder troughs supported along said frame between opposite ends thereof, separate means for vibrating each of said feeder troughs, and hopper means carried by said frame for feeding batch to said feeder troughs.

19. Apparatus according to claim 18 characterized by a downwardly-extending discharge chute for each of said feeder troughs located at the discharge end thereof, said chutes having means therein to retard the downward rate of movement of the batch.

20. Apparatus according to claim 19 characterized by means at the lower end of each of said chute for containing air-borne particles which tend to occur as the batch is deposited over the pool.

* * * * *